(12) United States Patent
Itoh (10) Patent No.: US 11,640,171 B2
(45) Date of Patent: May 2, 2023

(54) AUTONOMOUS DRIVING CONTROL APPARATUS

(71) Applicant: DENSO CORPORATION, Kariya (JP)

(72) Inventor: Akira Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/854,202

(22) Filed: Apr. 21, 2020

(65) Prior Publication Data

US 2020/0333788 A1  Oct. 22, 2020

(30) Foreign Application Priority Data

Apr. 22, 2019 (JP) .............................. JP2019-081084

(51) Int. Cl.
*G05D 1/02* (2020.01)
*G01C 21/34* (2006.01)
*B60W 60/00* (2020.01)
*B60W 50/02* (2012.01)

(52) U.S. Cl.
CPC ....... *G05D 1/0212* (2013.01); *B60W 50/0205* (2013.01); *B60W 60/001* (2020.02); *G01C 21/3415* (2013.01); *G05D 2201/0212* (2013.01); *G05D 2201/0213* (2013.01)

(58) Field of Classification Search
CPC ......... G05D 1/0212; G05D 2201/0212; G05D 2201/0213; B60W 60/001; G01C 21/3415
See application file for complete search history.

(56) References Cited

U.S. PATENT DOCUMENTS

| | | | | |
|---|---|---|---|---|
| 10,086,782 | B1 * | 10/2018 | Konrardy | B60W 40/04 |
| 10,579,070 | B1 * | 3/2020 | Konrardy | B60W 30/18163 |
| 10,684,621 | B2 * | 6/2020 | Matsubara | B60W 10/20 |
| 2014/0309927 | A1 * | 10/2014 | Ricci | H04W 4/60 |
| | | | | 701/424 |
| 2017/0131716 | A1 * | 5/2017 | Brekke | G01C 21/20 |
| 2017/0176993 | A1 * | 6/2017 | Kato | B60W 30/18163 |
| 2018/0046182 | A1 * | 2/2018 | Joyce | B60W 50/0225 |

(Continued)

FOREIGN PATENT DOCUMENTS

| | | |
|---|---|---|
| JP | 2016-068705 A | 5/2016 |
| JP | 2016-084093 A | 5/2016 |

(Continued)

*Primary Examiner* — Jeff A Burke
*Assistant Examiner* — Jerrod Irvin Davis
(74) *Attorney, Agent, or Firm* — Maschoff Brennan (57) ABSTRACT

In an autonomous driving control apparatus, a control unit communicable with the memory deter mines, upon execution of the autonomous driving, whether it is necessary to update a primary scheduled travel route for the autonomous vehicle toward a destination in accordance with at least one of failure information about the autonomous vehicle and route condition information indicative of a condition of the primary scheduled travel route. The control unit updates the primary scheduled travel route to a new scheduled travel route in accordance with one or more driving operations executable by the autonomous vehicle upon determination that it is necessary to update the scheduled travel route. The control unit controls the autonomous driving of the autonomous vehicle in accordance with the new scheduled travel route.

17 Claims, 5 Drawing Sheets

(56) References Cited

U.S. PATENT DOCUMENTS

| | | | |
|---|---|---|---|
| 2018/0050704 A1* | 2/2018 | Tascione | B60W 10/04 |
| 2018/0061148 A1* | 3/2018 | Dudar | G08G 1/165 |
| 2019/0113916 A1* | 4/2019 | Guo | B60W 50/02 |
| 2019/0351911 A1 | 11/2019 | Anezaki | |
| 2020/0086837 A1* | 3/2020 | Le Cornec | B60T 8/17558 |
| 2020/0208998 A1* | 7/2020 | Xiang | G01C 21/3461 |
| 2020/0231142 A1* | 7/2020 | Liu | G01C 21/28 |

FOREIGN PATENT DOCUMENTS

| | | |
|---|---|---|
| JP | 2018176800 A | 11/2018 |
| JP | 2020-175886 A | 10/2020 |

* cited by examiner

AUTONOMOUS DRIVING CONTROL APPARATUS

CROSS REFERENCE TO RELATED APPLICATIONS

This application is based on and claims the benefit of priority from Japanese Patent Application No. 2019-081084 filed on Apr. 22, 2019, the disclosure of which is incorporated in its entirety herein by reference.

TECHNICAL FIELD

The present disclosure relates to autonomous driving control apparatuses.

BACKGROUND

Autonomous driving control apparatuses control autonomous driving of an autonomous vehicle. An example of these autonomous driving control apparatuses is configured to pull over the autonomous vehicle to a safe place for the safety of the autonomous vehicle upon determination that a malfunction has occurred in a steering system of the autonomous vehicle.

SUMMARY

According to an exemplary aspect of the present disclosure, there is provided an autonomous driving control apparatus. The autonomous driving control apparatus includes a control unit configured to determine, upon execution of autonomous driving, whether it is necessary to update a primary scheduled travel route for an autonomous vehicle toward a destination in accordance with at least one of failure information about the autonomous vehicle and route condition information indicative of a condition of the primary scheduled travel route. The control unit is configured to update the primary scheduled travel route to a new scheduled travel route in accordance with one or more driving operations executable by the autonomous vehicle upon determination that it is necessary to update the scheduled travel route, and control the autonomous driving of the autonomous vehicle in accordance with the new scheduled travel route.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Inventor's Viewpoint

Autonomous driving control apparatuses for an autonomous vehicle are each configured to control, based on information measured by sensors installed in the autonomous vehicle, various actuators installed in the autonomous vehicle to thereby cause the autonomous vehicle to autonomously travel on a previously scheduled route toward a predetermined target place or target location.

An example of such autonomous driving control apparatuses, which is for example disclosed in each of Japanese Patent Application Publications No. 2016-84093 and 2016-68705, is configured to pull over an autonomous vehicle to a safe place for the safety of the autonomous vehicle upon determination that a malfunction has occurred in a steering system of the autonomous vehicle.

A closure of the previously scheduled route due to, for example, the occurrence of an accident may make it difficult for the autonomous vehicle to travel on the previously scheduled route. Similarly, limitation of the driving behavior of the autonomous vehicle due to failures of one or more sensors and/or actuators may also make it difficult for the autonomous vehicle to travel on the previously scheduled route.

Conventional technologies may not sufficiently disclose measures against such a situation where the autonomous vehicle cannot travel on the previously scheduled route. Users for autonomous vehicles may have therefore a desire to create technologies that address such a situation where the autonomous vehicle cannot travel on the previously scheduled route.

The present disclosure aims to satisfy the desire set forth above, and provides autonomous driving control apparatuses, each of which is capable of addressing such a situation where an autonomous vehicle cannot travel on a previously scheduled route.

According to a first exemplary aspect of the present disclosure, there is provided an autonomous driving control apparatus for causing an autonomous vehicle to execute autonomous driving. The autonomous driving control apparatus includes a memory, and a control unit communicable with the memory. The control unit is configured to determine, upon execution of the autonomous driving, whether it is necessary to update a primary scheduled travel route for the autonomous vehicle toward a destination in accordance with at least one of failure information about the autonomous vehicle and route condition information indicative of a condition of the primary scheduled travel route. The control unit is configured to update the primary scheduled travel route to a new scheduled travel route in accordance with one or more driving operations executable by the autonomous vehicle upon determination that it is necessary to update the scheduled travel route. The control unit is configured to control the autonomous driving of the autonomous vehicle in accordance with the new scheduled travel route.

According to a second exemplary aspect of the present disclosure, there is provided a method of causing an autonomous vehicle to execute autonomous driving. The method includes determining, upon execution of the autonomous driving, whether it is necessary to update a scheduled travel route for the autonomous vehicle toward a destination in accordance with at least one of failure information about the autonomous vehicle, and route condition information indicative of a condition of the scheduled travel route. The method includes updating the scheduled travel route to a new scheduled travel route in accordance with one or more driving operations executable by the autonomous vehicle upon determination that it is necessary to update the scheduled travel route. The method includes controlling the autonomous driving of the autonomous vehicle in accordance with the new scheduled travel route.

According to a third exemplary aspect of the present disclosure, there is provided an autonomous driving control apparatus for causing an autonomous vehicle to execute autonomous driving. The autonomous driving control apparatus includes a memory, and a control unit communicable with the memory. The control unit is configured to receive, upon execution of the autonomous driving, at least one of failure information about the autonomous vehicle and route condition information indicative of a condition of a primary scheduled travel route for the autonomous vehicle toward a destination. The control unit is configured to select, upon it being necessary to update the primary scheduled travel route in accordance with the at least one of failure information about the autonomous vehicle and route condition information indicative of the condition of the scheduled travel route, a new scheduled travel route that is different from the primary scheduled travel route, one or more driving operations executable by the autonomous vehicle enabling the autonomous vehicle to travel on the new scheduled travel route. The control unit is configured to control the autonomous driving of the autonomous vehicle to thereby cause the autonomous vehicle to reach the destination.

Each of the first to third exemplary aspects of the present disclosure changes or updates the primary scheduled travel route to the new scheduled travel route upon determination that it is necessary to change or update the scheduled travel route, and controls the autonomous driving of the autonomous vehicle in accordance with the new scheduled travel route.

This therefore makes it possible to address the occurrence of a situation where the autonomous vehicle, which is travelling on the primary scheduled travel route, has a difficulty in travelling on the primary scheduled travel route.

Embodiment

The following describes exemplary embodiments of the present disclosure with reference to the accompanying drawings. In the embodiments, like parts between the embodiments, to which like reference characters are assigned, are omitted or simplified to avoid redundant description.

First Embodiment

Figure 1:
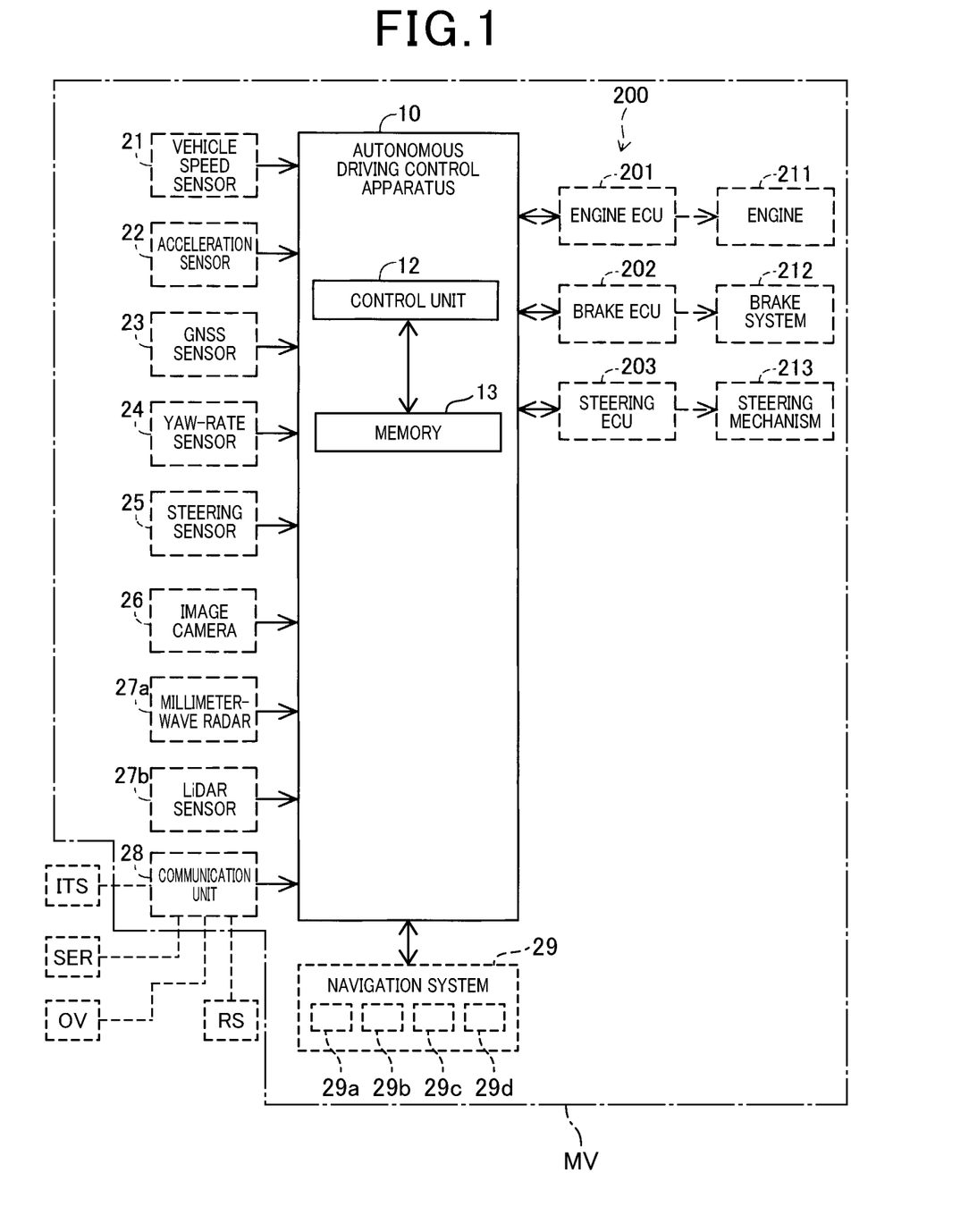
FIG. 1 is a block diagram schematically illustrating an example of the overall structure of a driving system and an autonomous driving control apparatus according to the first embodiment of the present disclosure.

The following describes an example of the configuration of each of an autonomous driving control apparatus 10 and a driving system 100 according to the first embodiment of the present disclosure with reference to FIG. 1.

Referring to FIG. 1, the driving system 100 is for example installed in an autonomous vehicle MV, which is controlled to autonomously travel. The driving system 100 is configured to assist and/or perform autonomous driving of the vehicle MV. Note that the vehicle MV in which the autonomous driving system 100 is installed will also be referred to as an own vehicle MV or a simply referred to as a vehicle MV.

The vehicle MV has installed therein the autonomous driving control apparatus 10 communicable with the driving system 100; the autonomous driving control apparatus 10 is comprised of, for example, an electronic control unit (ECU) as its main component.

The ECU is designed as, for example, a microcomputer including a control unit 12 and a memory 13 communicable with each other.

The control unit 12 is comprised of a processor, such as a CPU. The control unit 12 can be comprised of another type of processor, such as an application specific integrated circuit (ASIC). The memory 13 includes, for example, non-transitory tangible storage media that include, for example, a random-access memory (RAM) and a read only memory (ROM).

Various control programs including control programs for causing the control unit 12 to perform various tasks, i.e. routines, are stored in the memory 13. In addition, various data items usable by the control unit 12 are also stored in the memory 13. The control unit 12 reads at least one of the control programs from the memory 13, and executes the at least one program to thereby execute the routine corresponding to the at least one control program. In other words, the control unit 12 executes the at least one control program to thereby implement predetermined functional modules based on the at least one control program. In addition, the control unit 12 is configured to control overall operations of the autonomous driving control apparatus 10.

The own vehicle MV is configured to include an engine 211, a brake system 212, and a steering mechanism 213, and is controlled to switchably operate in an autonomous driving mode and a manual mode. For example, a switch can be mounted to an instrument panel of the vehicle MV; this switch enables a driver's operation to send, to the control unit 12 therefrom, a selection signal indicative of one of the autonomous driving mode and manual mode as an operation mode of the vehicle MV.

The autonomous driving mode represents the operation mode of the vehicle MV in which control of the engine 211, control of the brake system 212 installed in the vehicle MV, and control of the steering mechanism 213 of the vehicle MV are autonomously performed without driver's driving operations to thereby cause the vehicle MV to autonomously travel or stop.

In contrast, the manual mode represents the operation mode of the vehicle MV in which operation of the engine 211, such as operation of an accelerator pedal of the vehicle MV linked to the engine 211, operation of the brake system 212, such as operation of a brake pedal of the vehicle MV linked to the brake system, and operation of the steering mechanism 213, such as operation of a steering wheel of the vehicle MV, are performed by a driver of the vehicle MV.

The driving system 100 includes, for example, a vehicle speed sensor 21, an acceleration sensor 22, a global navigation satellite system (GNSS) sensor 23, a yaw rate sensor 24, a steering sensor 25, image cameras 26, millimeter-wave radars 27a, light detection and ranging or an imaging detection and ranging (LiDAR) sensors 27b, a communication unit 28, and a navigation system 29. These components 21, 22, 23, 24, 25, 26, 27a, 27b, 28, and 29 are communicably connected to the autonomous driving control apparatus 10.

The driving system 100 also includes a drive control apparatus 200 communicably connected to the autonomous driving control apparatus 10.

Note that the autonomous driving control apparatus 10 can include one or more components of the driving system 100.

Measurements measured by the above sensors 21 to 27b and information received by the communication unit 28 are sent to the autonomous control apparatus 10, and the autonomous control apparatus 10 is configured to instruct, based on the measurements and information, the driving control apparatus 20 to control the engine 211, the brake system 212, and the steering mechanism 213 for causing the vehicle MV to autonomously travel.

The vehicle speed sensor 21 is configured to measure a value of the speed of the own vehicle MV, and send a measurement signal indicative of the value of the speed of the own vehicle MV to the autonomous driving control apparatus 10.

The acceleration sensor 22 is configured to measure a value of acceleration of the own vehicle MV, and send a measurement signal indicative of the value of the acceleration of the own vehicle MV to the autonomous driving control apparatus 10.

The GNSS sensor 23 is comprised of, for example, a global positioning system (GPS) receiver. The GPS receiver is configured to receive, via a GPS antenna, GPS signals, which are sent from GPS satellites, to thereby calculate for example the latitude and longitude of the position of the GPS antenna of the vehicle MV based on the received GPS signals as position data of the GPS antenna.

The GNSS sensor unit 23 is configured to calculate, as a current position of the vehicle MV, based on the GPS signals, and send a measurement signal indicative of the current position of the vehicle MV to the autonomous driving control apparatus 10.

The yaw rate sensor 24 is configured to measure an angular velocity of the vehicle MV around its vertical axis, and send a measurement signal indicative of the angular velocity of the vehicle MV to the autonomous driving control apparatus 10. The steering sensor 25 is configured to measure a steering angle of the steering wheel of the vehicle MV, and sent a measurement single indicative of the steering angle to the autonomous driving control apparatus 10.

The image cameras 26 include a front camera mounted to the front of the vehicle MV. The front camera is configured to capture images, i.e. front images, of a front view of the vehicle MV, and send, to the autonomous driving control apparatus 10, the captured front images.

In addition, the image cameras 26 include a rear camera, a left camera, and a right camera. The rear camera is configured to capture images, i.e. rear images, of a rear view of the vehicle MV, and send, to the autonomous driving control apparatus 10, the captured rear images. The left camera is configured to capture images, i.e. left images, of a left-side view of the vehicle MV, and send, to the autonomous driving control apparatus 10, the captured left images. The right camera is configured to capture images, i.e. right images, of a right-side view of the vehicle MV, and send, to the autonomous driving control apparatus 10, the captured right images.

A monocular camera can be used as each image camera 26. A stereo camera comprised of two or more cameras or a multi camera can be used as each image camera 26.

Each millimeter-wave radar 27a is configured to (1) Transmit, to a predetermined corresponding surrounding region of the vehicle MV, millimeter radio waves as probing waves (2) Receive reflection radio waves, i.e. echoes, generated based on reflection of the transmitted millimeter radio waves by objects located around the vehicle MV (3) Detect, based on the received reflection radio waves, the existence, location, size, distance, and/or relative speed of each of the objects relative to the vehicle MV Note that each object is detected by the millimeter-wave radars 27a as the collection of detected points on the corresponding object.

Each LiDAR 27b is configured to (1) Transmit, to a predetermined corresponding surrounding region of the vehicle MV, laser waves as probing waves (2) Receive reflection laser waves, i.e. echoes, generated based on reflection of the transmitted laser waves by objects located around the vehicle MV (3) Detect, based on the received reflection laser waves, the existence, location, size, distance, and/or relative speed of each of the objects relative to the vehicle MV For example, the millimeter-wave radars 27a include a front millimeter-wave radar to transmit, to a front region of the vehicle MV, the millimeter radio waves, a rear millimeter-wave radar to transmit, to a rear region of the vehicle MV, the millimeter radio waves, a left millimeter-wave radar to transmit, to a left-side region of the vehicle MV, the millimeter radio waves, and a right millimeter-wave radar to transmit, to a right-side region of the vehicle MV, the millimeter radio waves.

Similarly, the LiDAR sensors 27b for example include a front LiDAR sensor to transmit, to a front region of the vehicle MV, the laser waves, a rear LiDAR sensor to transmit, to a rear region of the vehicle MV, the laser waves, a left LiDAR sensor to transmit, to a left-side region of the vehicle MV, the laser waves, and a right LiDAR sensor to transmit, to a right-side region of the vehicle MV, the laser waves.

The communication unit 28 is configured to perform inter-vehicle communications by wirelessly accessing other vehicles OV located around the own vehicle MV to thereby (1) Send, to each of the other vehicles, own-vehicle information including driving conditions and surrounding conditions of the vehicle MV (2) Receive, from each of the other vehicles OV, other-vehicle information including driving conditions and surrounding conditions of the corresponding other vehicle OV The communication unit 28 can be configured to perform at least one of 1. Radio communications with an intelligent transport system (ITS) to thereby communicate with the other vehicles OV via the ITS 2. Radio communications with each of the other vehicles OV 3. Radio communications with roadside radio stations RS located on roadsides to thereby communicate with the other vehicles OV via the roadside radio stations RS The communication unit 28 also enables the autonomous driving control apparatus 10 to communicate, by radio, with one or more traffic servers SER established outside the vehicle MV to thereby obtain (1) Traffic condition information (2) Weather condition information The weather condition information represents, for example, the weather condition, such as a bright condition, a rain condition, a cloud condition, a snow condition, a fog condition, or a sandstorm condition around the vehicle MV, which can be collected by at least one of the traffic servers SER.

The traffic condition information for example includes various types of traffic information about each road on which the vehicle MV can travel.

For example, the traffic condition information can include

1. Map information items about many route candidate roads on which the vehicle MV is travelable 2. Accident information indicative of whether an accident has occurred in at least one of the route candidate roads 3. Regulation information including a speed limit of each route candidate road, information about whether passing is permitted for each route candidate road, and information about whether there are traffic regulations for each route candidate road The navigation system 29 includes a display 29*a*, a sound speaker 29*b*, an input unit 29*c*, and a large-capacity storage 29*d*, and is configured to store, in the large-capacity storage 29*d*, various road information items and map information items about many roads that the vehicle MV is travelable.

Specifically, the navigation system 29 is configured to continuously display a road map on the display 29*a* around the current position of the vehicle MV, and display, on the road map, a selected route from the current position of the vehicle MV to a destination in response to when a driver of the vehicle MV inputs the destination using the input unit 29*c*.

In particular, the navigation system 29 is configured to determine the selected route from the current position of the vehicle MV to the destination upon the vehicle MV being controlled in the manual mode. In contrast, the autonomous driving control apparatus 10 is configured to determine the selected route from the current position of the vehicle MV to the destination upon the vehicle MV being controlled in the autonomous driving mode.

The navigation system 29 is configured to obtain the road information about one or more roads included in the selected route, and provide the road information to the autonomous driving control apparatus 10. The navigation system 29 is also configured to provide, to a driver of the vehicle MV, a visible and audible guide for enabling the vehicle MV to travel along the selected route using the display 29*a* and the sound speaker 29*b*.

The drive control apparatus 200 serves as, for example, a controller that controls operations of the own vehicle MV.

Specifically, the drive control apparatus 200 includes an engine ECU 201, a brake ECU 202, and a steering ECU 203.

The engine ECU 201 is configured to control operations of the engine 211. The engine 211 is comprised of an internal combustion engine, a motor, or both an internal combustion engine and a motor.

Specifically, the engine ECU 201 is configured to control various actuators of the internal combustion engine installed in the vehicle MV as the engine 211 to thereby adjust 1. An open or close operation of a throttle valve of the engine 211

2. A fuel injection operation of each injector for spraying a controlled quantity of fuel into a corresponding one of cylinders of the engine 211

3. An ignition of each igniter for igniting the compressed air-fuel mixture or the mixture of the compressed air and fuel in a corresponding one of the cylinders of the engine 211

4. An open or close operation of each intake valve of the engine 211

The above control operations of the engine 211 burn the compressed air-fuel mixture or the mixture of the compressed air and fuel in each cylinder of the engine 211, thus outputting controlled drive power to thereby rotatably drive driving wheels of the vehicle MV.

The engine ECU 201 is also configured to control the motor installed in the vehicle MV as the engine 211 to thereby output controlled drive power to thereby rotatably drive the driving wheels of the vehicle MV.

In addition, the engine ECU 201 is further configured to control both the internal combustion engine and motor each of which is installed in the vehicle MV as the engine 211 to thereby rotatably drive the driving wheels of the vehicle MV.

Note that, upon the operation mode of the vehicle MV being set to the manual mode, the engine ECU 201 is configured to control the engine 211 to cause the engine 211 to generate drive power based on an operated amount of an accelerator pedal operated by a driver of the vehicle MV, thus rotatably driving the driving wheels based on the generated drive power.

In contrast, upon the operation mode of the vehicle MV being set to the autonomous driving mode, the engine ECU 201 is configured to control the engine 211 to cause the engine 211 to generate drive power based on requested drive power instructed from the autonomous driving control apparatus 10, thus rotatably driving the driving wheels based on the generated drive power.

The brake system 212 includes various sensors and actuators; these actuators include motors, valves, and pumps, which are linked to each other and configured to brake the vehicle MV.

The brake ECU 202 is configured to

1. Determine a predetermined timing and a predetermined amount of braking in accordance with an operated timing and amount of a brake pedal operated by a driver of the vehicle MV when the operation mode of the vehicle MV is set to the manual mode 2. Control each of the actuators based on measurement values of the respective sensors and the determined timing and amount of braking to thereby slow down the vehicle MV based on the generated brake power at the determined timing The brake ECU 202 is also configured to 1. Determine a predetermined timing and a predetermined amount of braking in accordance with instructions sent from the autonomous driving control apparatus 10 when the operation mode of the vehicle MV is set to the autonomous driving mode 2. Control each of the actuators based on measurement values of the respective sensors and the determined timing and amount of braking to thereby slow down the vehicle MV based on the generated brake power at the determined timing The steering mechanism 213 includes one or more actuators configured to generate assist torque for assisting a driver's steering operation of the steering wheel or steering torque for steering the steering wheel.

The steering ECU 203 is configured to determine assist torque or an assist steering angle based on the measurements of the respective yaw rate sensor 24 and steering sensor 25 to thereby cause the one or more actuators to generate the assist steering torque upon the operation mode of the vehicle MV being set to the manual mode. This assist torque assists the driver's steering operation of the steering wheel.

The steering ECU 203 is also configured to determine steering torque or steering angle based on the measurements of the respective yaw rate sensor 24 and steering sensor 25 to thereby cause the one or more actuators to generate the steering torque upon the operation mode of the vehicle MV being set to the autonomous driving mode. This steering torque turns the steering wheel.

Next, the following describes an example of the configuration of the autonomous driving control apparatus 10.

Referring to FIG. 1, the autonomous driving control apparatus 10 includes the control unit 12.

As described above, the control unit 12 is configured to receive the measurement signals sent from the respective sensors 21 to 27b, information sent from the communication unit 28, and information sent from the navigation system 29, and send, to at least one of the engine ECU 201, brake ECU 202, and steering ECU 203, an instruction; the instruction causes the at least one of the engine ECU 201, brake ECU 202, and steering ECU 203 to control at least one of the engine 211, brake system 212, and steering mechanism 231, thus causing the vehicle MV to perform driving operations or driving behaviors including (i) forward travelling, (ii) rearward travelling, (iii) right turning, (iv) left turning, (v) stopping, and other various driving operations.

That is, the control unit 12 is configured to perform input-output operations from and/or to the components 21 to 29 and 201 to 203 or other components, which are unillustrated in FIG. 1, to thereby control autonomous driving of the vehicle MV upon the operation mode of the vehicle MV being set to the autonomous driving mode.

In particular, the autonomous driving control apparatus 10 is configured to devise a travelling schedule or plan for the vehicle MV, and cause the vehicle MV, i.e. the driving system 100 of the vehicle MV, to autonomously travel in accordance with the devised travelling schedule.

Specifically, upon receiving, from the navigation system 29, a destination inputted by, for example, a driver's operation of the input unit 29c, the autonomous driving control apparatus 10 is configured to determine a scheduled travel route from the current position of the vehicle MV to the destination in accordance with, for example, the map information stored in the large-capacity storage 29d or the map information sent from the one or more traffic servers SER.

Next, the autonomous driving control apparatus 10 is configured to generate a combination of each predetermined point on the scheduled travel route to a corresponding one of the driving operations (driving behaviors) including, for example, the forward travelling, rearward travelling, right turning, and left turning; the driving operation for each predetermined point of the scheduled travel route is required to travel through the corresponding point. This results in the travelling schedule for the vehicle MV being determined.

The autonomous driving control apparatus 10 is configured to control the autonomous driving of the vehicle MV using the driving system 100 in accordance with the combination to thereby cause the vehicle MV to reach the destination.

In particular, the autonomous driving control apparatus 10 is configured to determine whether it is necessary to change or update the scheduled travel route to another route while causing the vehicle MV to autonomously travel in accordance with 1. Failure information indicative of whether a failure or a malfunction has occurred in the vehicle MV
2. Route condition information indicative of the condition of each road included in the scheduled travel route
3. The traffic condition information received by the communication unit 28

Upon determining that it is necessary to change the scheduled travel route to another route, the autonomous driving control apparatus 10 is configured to 1. Determine a changed travel route from the current position of the vehicle MV to the destination
2. Recognize driving operations (driving behaviors) currently executable by the vehicle MV
3. Generate a combination, which will be referred to as a change combination, of each predetermined point on the changed travel route to a corresponding one of the recognized executable driving operations (driving behaviors); the recognized executable driving operation combined to each predetermined point of the changed travel route is required to travel through the corresponding point of the changed travel route. This results in the travelling schedule for the vehicle MV being determined, which enables the vehicle MV to travel to the destination Then, the autonomous driving control apparatus 10 is configured to control the autonomous driving of the vehicle MV using the driving system 100 in accordance with the changed combination to thereby cause the vehicle MV to reach the destination.

For example, the autonomous driving control apparatus 10 is configured to access each of the components 21 to 26, 27a, 27b, 28, 29, and 201 to 203 to thereby obtain, from each of the components 21 to 26, 27a, 27b, 28, 29, and 201 to 203, failure information about the vehicle MV, which represents (1) Whether a failure has occurred in the corresponding one of the components 21 to 26, 27a, 27b, 28, 29, and 201 to 203

(2) The degree of the occurred failure

Then, the autonomous driving control apparatus 10 is configured to determine whether a failure or trouble has occurred in each of the components 21 to 26, 27a, 27b, 28, 29, and 201 to 203 in accordance with the failure information about the vehicle MV.

For example, the autonomous driving control apparatus 10 is configured to send, to each of the components 21 to 26, 27a, 27b, 28, 29, and 201 to 203, a request for sending the failure information about the corresponding one of the components 21 to 26, 27a, 27b, 28, 29, and 201 to 203. At that time, the autonomous driving control apparatus 10 can be configured to determine that a failure has occurred in at least one of the components 1 to 26, 27a, 27b, 28, 29, and 201 to 203 upon determining that no reply have been sent from the at least one of the components 1 to 26, 27a, 27b, 28, 29, and 201 to 203 for a predetermined threshold period.

That is, the autonomous driving control apparatus 10 is configured to recognize driving operations (driving behaviors) currently executable by the vehicle MV in accordance with determination of whether a failure has occurred in each of the components 1 to 26, 27a, 27b, 28, 29, and 201 to 203.

As described above, the autonomous driving control apparatus 10 is configured to determine whether it is necessary to change the scheduled travel route to another route using the route condition information indicative of the conditions of each road included in the scheduled travel route.

For example, the autonomous driving control apparatus 10 can be configured to obtain, from at least one of the image camera 26, millimeter-wave radar 27a, and LiDAR sensor 27b, the route condition information.

As another example, the autonomous driving control apparatus 10 can be configured to perform (i) radio communications with at least one of the intelligent transport system ITS, (ii) radio communications between the vehicle MV and at least one other vehicle OV located around the vehicle MV, and/or (iii) radio communications with at least one roadside ratio station located on a roadside of at least one road included in the scheduled travel route, thus obtaining the route condition information.

Figure 2:
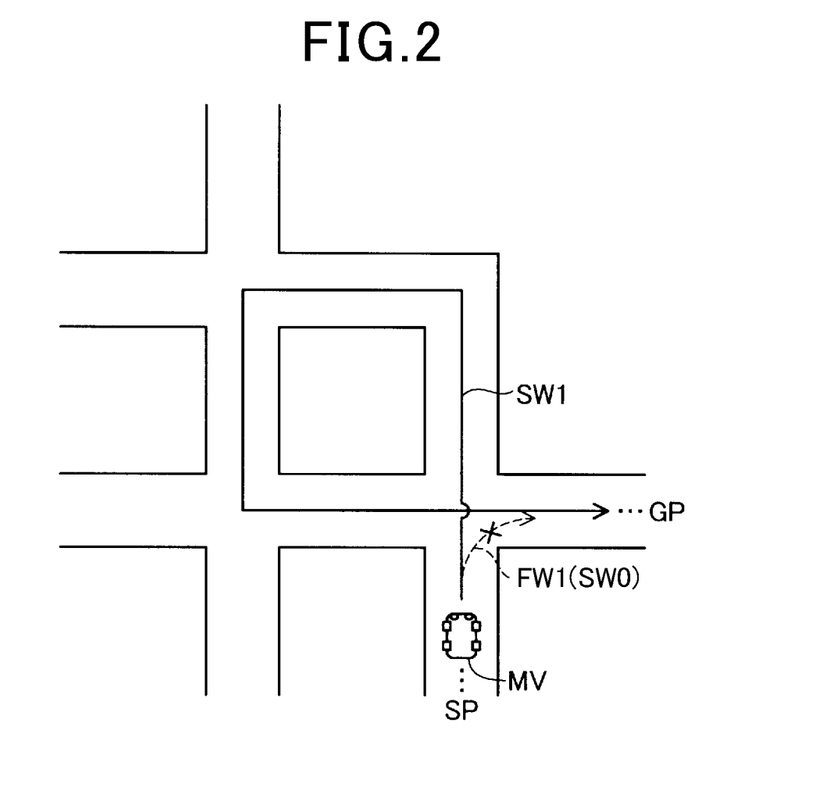
FIG. 2 is a view schematically illustrating an example of an own vehicle that is travelling toward a destination in accordance with a primary scheduled travel route.

Next, the following describes a situation where change of the scheduled travel route is required based on the failure information about the own vehicle MV with reference to FIG. 2.

FIG. 2 schematically illustrates that the own vehicle MV, in which the driving system 100 and the autonomous driving control apparatus 10 are installed, has started autonomous travelling from a start point SP toward a destination GP.

Before starting of autonomous travelling from the start point SP that is the current position of the own vehicle MV, the autonomous driving control apparatus 10 determines a scheduled travel route SWO from the current position SP of the vehicle MV to the destination GP upon receiving, from the navigation system 29, the destination GP inputted by, for example, a driver's operation of the input unit 29c.

In the region illustrated in FIG. 2, the own vehicle MV tries to autonomously travel through a right-turn route segment FW1 of the scheduled travel route SWO in accordance with the scheduled travel route SWO. At that time, the autonomous driving control apparatus 10 recognizes, based on the failure information about the vehicle MV obtained from each the components 21 to 26, 27a, 27b, 28, 29, and 201 to 203, that the own vehicle MV fails to execute a right turn.

In response to the recognition, the control unit 12 of the autonomous driving control apparatus 10 determines that it is necessary to change the original scheduled travel route SWO to a new scheduled travel route SW1 that is comprised of straight-travel route segments and left-turn route segments without including right-turn route segments. Then, the control unit 12 controls autonomous driving of the own vehicle MV to thereby cause the own vehicle MV to travel in accordance with the changed scheduled travel route SW1 toward the destination GP.

As described above, upon obtaining the failure information about the own vehicle MV, the control unit 12 determines that it is necessary to change the original scheduled travel route to a new scheduled travel route upon determining that the driving operations currently executable by the vehicle MV fail to travel in accordance with the original scheduled travel route.

In contrast, upon obtaining the failure information about the own vehicle MV, the control unit 12 determines that it is unnecessary to change the original scheduled travel route to a new scheduled travel route upon determining that the driving operations currently executable by the vehicle MV are able to travel in accordance with the original scheduled travel route.

For example, even if recognizing that the vehicle MV fails to travel in a rear direction thereof based on the failure information about the own vehicle MV, the control unit 12 determines that it is unnecessary to change the original scheduled travel route to a new scheduled travel route upon determining that the driving operations currently executable by the vehicle MV are able to travel in accordance with the original scheduled travel route.

Figure 3:
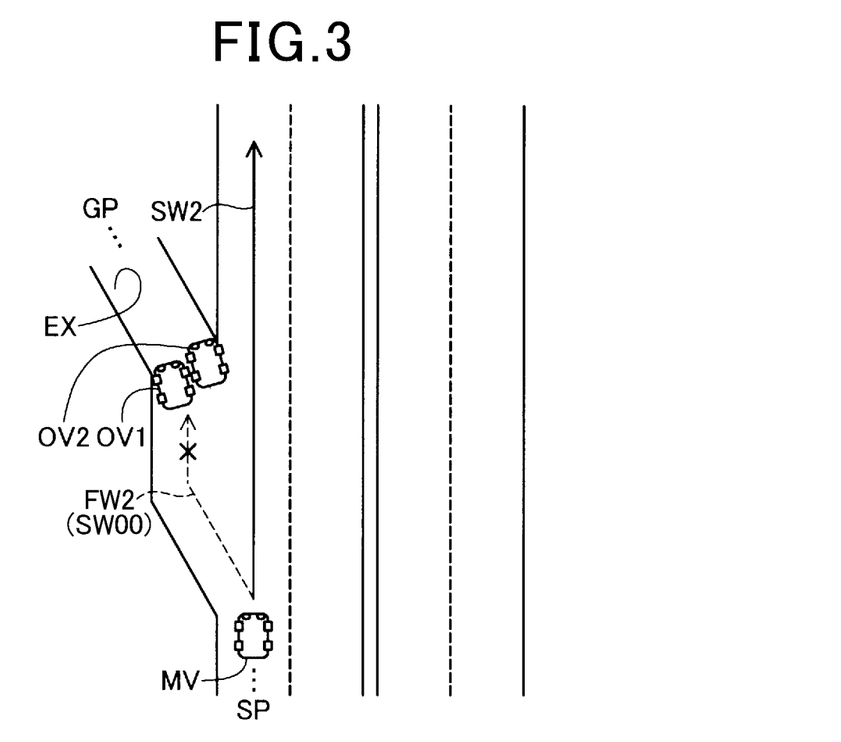
FIG. 3 is a view schematically illustrating another example of the own vehicle that is travelling toward a destination in accordance with a primary scheduled travel route.

Next, the following describes a situation where change of the scheduled travel route is required based on the conditions of each road included in the scheduled travel route with reference to FIG. 3.

Like FIG. 2, FIG. 3 schematically illustrates that the own vehicle MV, in which the driving system 100 and the autonomous driving control apparatus 10 are installed, has started autonomous travelling from a start point SP1 toward a destination GP1. FIG. 3 specifically illustrates a region is located close to an exit EX of a highway HWt.

Before starting of autonomous travelling from the start point SP1 that is the current position of the own vehicle MV, the autonomous driving control apparatus 10 determines a scheduled travel route SW00 from the current position SP1 of the vehicle MV to the destination GP1 upon receiving, from the navigation system 29, the destination GP1 inputted by, for example, a driver's operation of the input unit 29c.

In the region illustrated in FIG. 3, the own vehicle MV tries to autonomously travel through a route segment FW2 of the scheduled travel route SW00 in accordance with the scheduled travel route SW00; the route segment FW2 represents a route segment that guides vehicles travelling on the highway HW toward the exit EX of the highway HW.

At that time, the autonomous driving control apparatus 10 recognizes, based on the route condition information about the scheduled travel route SW00, i.e. the route segment FW2, that the own vehicle MV fails to pass through the exit EX. For example, as illustrated in FIG. 3, the route condition information about the route segment FW2 represents that an accidental contact between other vehicles OV1 and OV2 blocks the exit EX.

In response to the recognition, the control unit 12 of the autonomous driving control apparatus 10 determines that it is necessary to change the original scheduled travel route SW00 to a new scheduled travel route SW2 that causes the own vehicle MV to turn off the highway HW from the next exit following the exit EX, and thereafter to travel toward the destination GP1. Then, the control unit 12 controls autonomous driving of the own vehicle MV to thereby cause the own vehicle MV to travel in accordance with the changed scheduled travel route SW2 toward the destination GP1.

As described above, upon obtaining the route condition information about a scheduled travel route, the control unit 12 determines that it is necessary to change the original scheduled travel route to a new scheduled travel route upon determining that the own vehicle MV fails to travel in accordance with the scheduled travel route.

For example, cases where the own vehicle MV fails to travel in accordance with a scheduled travel route include 1. A first sudden-factor where one or more accident vehicles block the travelling of the own vehicle MV on the scheduled travel route 2. A second sudden-factor where fallen rocks and/or mudslide prevent the own vehicle MV from travelling on the scheduled travel route 3. A third sudden-factor where cracks in one or more roads included in the scheduled travel route prevent the own vehicle MV from travelling on the scheduled travel route In contrast, upon obtaining the route condition information about a scheduled travel route, the control unit 12 determines that it is unnecessary to change the original scheduled travel route to a new scheduled travel route upon determining that the own vehicle MV is able to travel in accordance with the scheduled travel route.

For example, even if recognizing that an accident has occurred in a scheduled travel route, the control unit 12 determines that it is unnecessary to change the original scheduled travel route to a new scheduled travel route upon determining that the accident does not interrupt the travelling of the own vehicle MV.

Next, the following describes a route change routine carried out by the control unit 12 of the autonomous driving control apparatus 10 according to the first embodiment. In other words, the control unit 12 executes instructions of at least one control program stored in the memory 13 to thereby execute the route change routine illustrated as a flowchart in FIG. 4 every predetermined control period while the own vehicle MV is performing autonomous driving.

Figure 4:
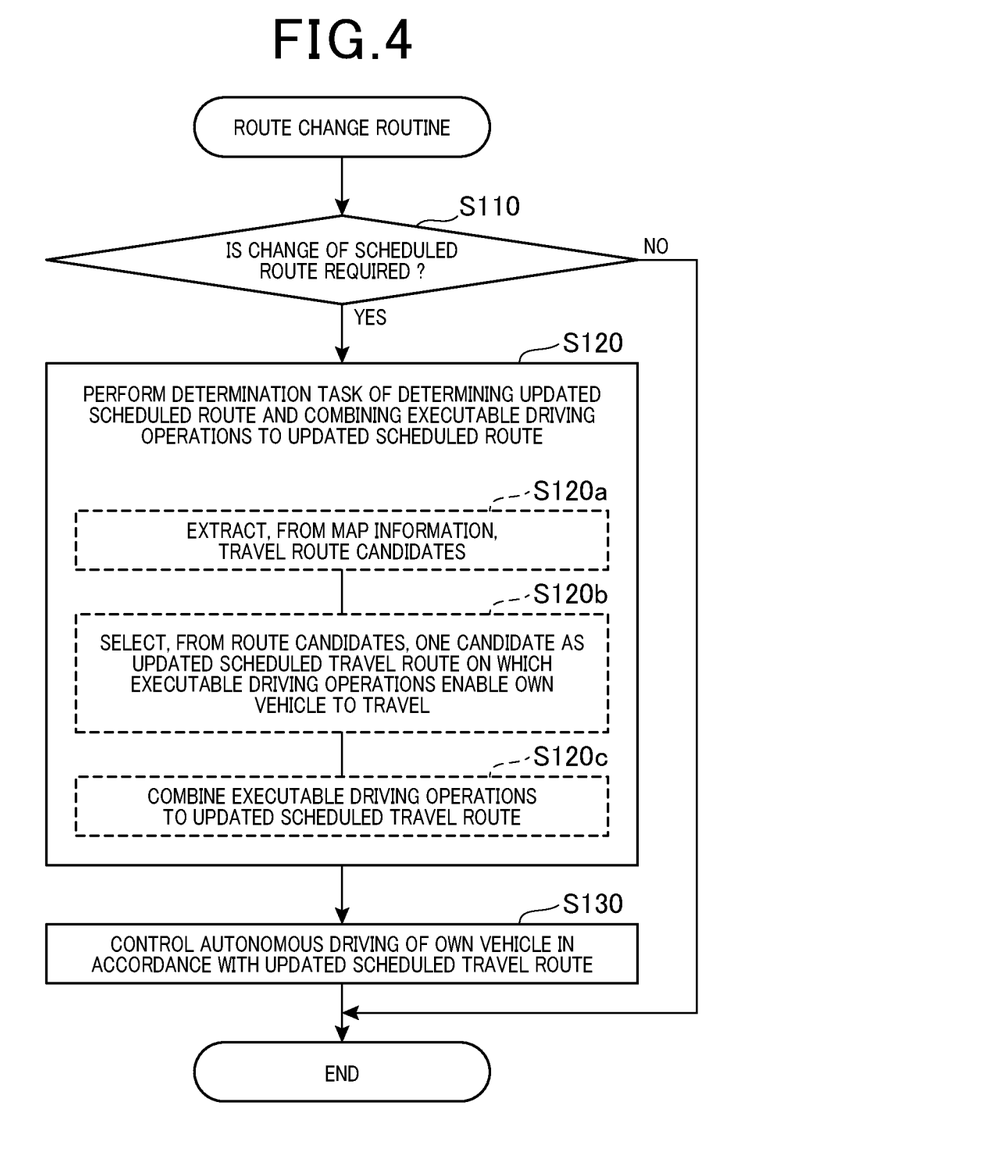
FIG. 4 is a flowchart schematically illustrating a route change routine carried out by the autonomous driving control apparatus.

When starting the route change routine, the control unit 12 obtains the failure information about the vehicle MV from, for example, each of the components 21 to 26, 27a, 27b, 28, 29, and 201 to 203, and obtains the route condition information about a primary scheduled travel route from, for example, at least one of the sensors 26, 27a, and 27b after determination of the primary scheduled travel route from a predetermined start point to a predetermined destination in step S110.

Then, the control unit 12 determines whether it is necessary to change the primary scheduled travel route to a new one in accordance with at least one of the failure information about the own vehicle MV and the route condition information about the primary scheduled travel route in step S110.

Upon determination that it is unnecessary to change the primary scheduled travel route to a new one in accordance with at least one of the failure information about the own vehicle MV and the route condition information about the primary scheduled travel route (NO in step S110), the control unit 12 terminates the route change routine.

Otherwise, upon determination that it is necessary to change the primary scheduled travel route to a new one in accordance with at least one of the failure information about the own vehicle MV and the route condition information about the primary scheduled travel route (YES in step S110), the route change routine proceeds to step S120.

That is, the route change routine proceeds to step S120 upon determination that the failure information about the own vehicle V blocks travelling of the own vehicle MV in accordance with the primary scheduled route, or determination that the route condition information about the primary scheduled travel route prevents the own vehicle MV from travelling on the primary scheduled travel rout.

In step S120, the control unit 12 performs a determination task of determining a changed scheduled travel route, and combining, to each of predetermined points included in the changed scheduled travel route, a corresponding one of executable driving operations, i.e. driving behaviors, of the own vehicle MV.

Specifically, the control unit 12 extracts, from the map information stored in the memory 13 or received from the one or more traffic servers SER, plural travel route candidates from the current position of the own vehicle MV to the destination in step S120a.

Next, the control unit 12 selects, from the extracted travel route candidates, one of the extracted travel route candidates as a changed scheduled travel route or an updated scheduled travel route on which executable driving operations (driving behaviors) of the own vehicle MV enable the own vehicle MV to travel in step S120b. That is, the updated scheduled travel route includes a plurality of predetermined points, and the control unit 12 combines, to each of the points, a corresponding one of the executable driving operations (driving behaviors) of the own vehicle MV.

For example, it is assumed that priorities are previously assigned to the respective driving operations of the own vehicle MV. In this assumption, the control unit 12 can select, from the extracted travel route candidates, one of the extracted travel route candidates as the updated scheduled travel route, which includes the largest number of driving operations that have the highest priority in step S120b.

As another example, it is assumed that priorities are previously assigned to respective selection criteria; the selection criteria for example include 1. A first criterion about the distance of each travel route candidate
2. A second criterion about whether each travel route candidate includes toll roads
3. A third criterion about the number of right-turns and left-turns included in each travel route candidate That is, the control unit 12 can select, from the extracted travel route candidates, one of the extracted travel route candidates as the updated scheduled travel route, in accordance with the prioritized selection criteria in step S120b.

For example, the control unit 12 can select, from the extracted travel route candidates, one of the extracted travel route candidates as the updated scheduled travel route, which includes the shortest distance, no toll roads, and the shortest number of right-turns and left-turns upon the same priority being assigned to each of the selection criteria in step S120b.

In contrast, the control unit 12 can select, from the extracted travel route candidates, a first travel route candidate as the updated scheduled travel route, which includes the shortest distance and toll roads although a second travel route candidate includes no toll roads, because the priority assigned to the first selection criterion of "distance" is higher than the priority assigned to the second selection criterion of "toll roads" in step S120b.

Then, the control unit 12 combines, to each of predetermined points included in the updated scheduled travel route, a corresponding one of the executable driving operations, i.e. driving behaviors, of the own vehicle MV in step S120c.

Following the operation in step S120, the control unit 12 controls, via the driving system 100, autonomous driving of the own vehicle MV to thereby cause the own vehicle MV to travel in accordance with the updated scheduled travel route toward the destination in step S130. Thereafter, the control unit 12 terminates the route change routine.

As described in detail above, the autonomous driving control apparatus 10 according to the first embodiment is configured to, even upon determination that it is necessary to change or update a primary scheduled travel route to a new one, combine driving operations executable by the own vehicle MV with a new updated scheduled travel route, and cause the own vehicle MV to travel toward a predetermined destination in accordance with the new updated scheduled travel route. This configuration reliably addresses a situation where the own vehicle MV, which has been travelling in accordance with the primary scheduled travel route, fails to travel in accordance with the primary scheduled travel route.

Second Embodiment

Figure 5:
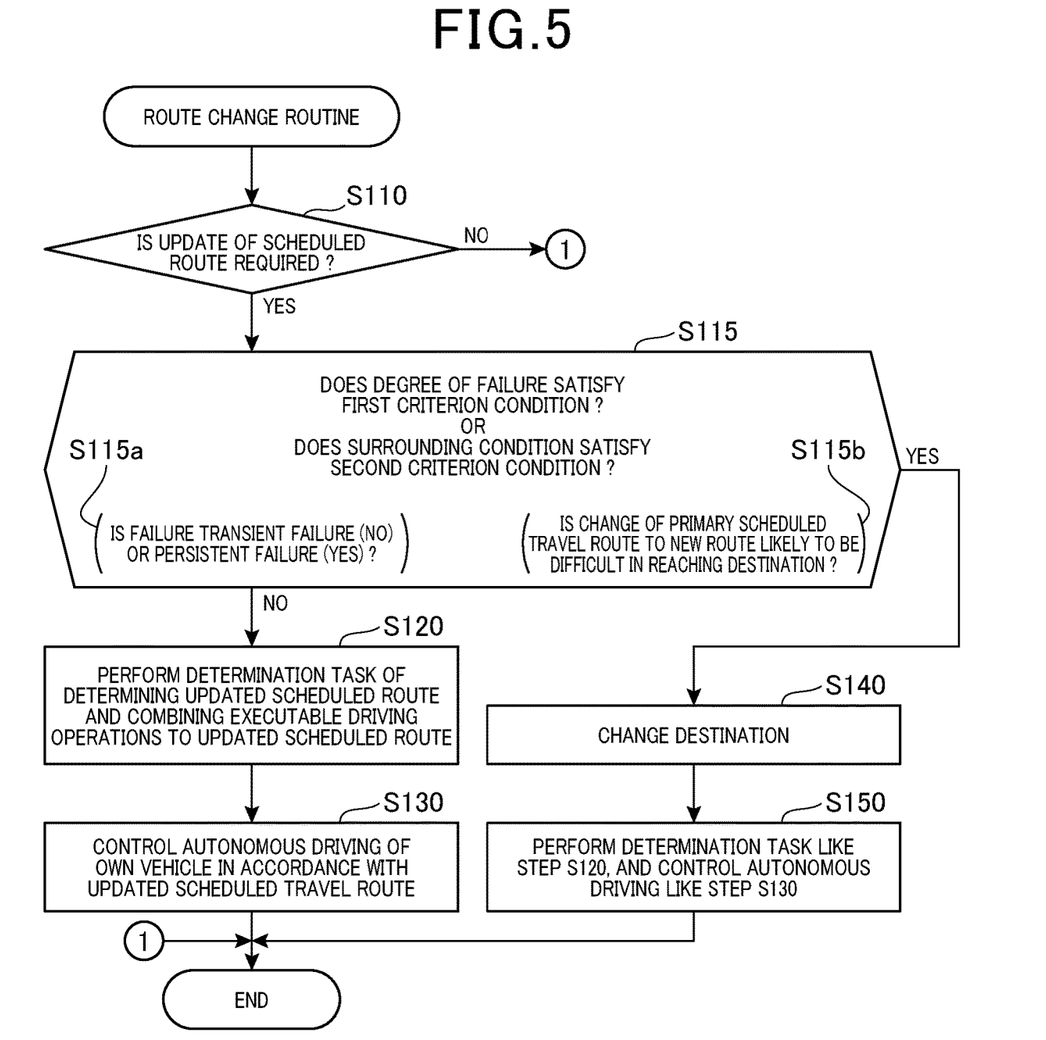
FIG. 5 is a flowchart schematically illustrating a route change routine carried out by an autonomous driving control apparatus according to the second embodiment of the present disclosure.

The following describes an autonomous driving control apparatus 10 according to the second embodiment of the present disclosure with reference to FIG. 5. The configuration and functions of the autonomous driving control apparatus 10 according to the second embodiment are mainly different from those of the autonomous driving control apparatus 10 according to the first embodiment by the following points. The following therefore mainly describes the different points.

The control unit 12 of the autonomous driving control apparatus 10 according to the second embodiment is configured to execute a route change routine illustrated in FIG. 5, which is slightly different from the route change routine illustrated in FIG. 4.

When starting the route change routine, the control unit 12 obtains the failure information about the vehicle MV from, for example, each of the components 21 to 26, 27a, 27b, 28, 29, and 201 to 203, and obtains the route condition information about a primary scheduled travel route from, for example, at least one of the sensors 26, 27a, and 27b after determination of the primary scheduled travel route from a predetermined start point to a predetermined destination in step S110.

Then, the control unit 12 determines whether it is necessary to change or update the primary scheduled travel route to a new one in accordance with at least one of the failure information about the own vehicle MV and the route condition information about the primary scheduled travel route in step S110.

Upon determination that it is necessary to update the primary scheduled travel route to a new one in accordance with at least one of the failure information about the own vehicle MV and the route condition information about the primary scheduled travel route (YES in step S110), the route change routine proceeds to step S115.

In step S115, the control unit 12 determines whether the degree of the occurred failure included in the failure information satisfies a predetermined first criterion condition upon determination that the failure information about the own vehicle MV causes affirmative determination in step S110.

Additionally, in step S115, the control unit 12 determines whether the surrounding conditions around the own vehicle MV satisfy a predetermined second criterion condition upon determination that either the failure information about the own vehicle MV or the route condition information causes affirmative determination in step S110.

Each of the first and second criterion conditions represents a predetermined degree or level of difficulty in travelling of the own vehicle MV toward the initial destination.

The following describes in detail the first criterion condition that serves as a criterion for the degree of a failure that has occurred in the own vehicle MV As described above, the control unit 12 of the autonomous driving control apparatus 10 is configured to 1. Obtain, from each of the components 21 to 26, 27a, 27b, 28, 29, and 201 to 203, failure information about the own vehicle MV, which represents whether a failure has occurred in the corresponding one of the components 21 to 26, 27a, 27b, 28, 29, and 201 to 203

2. Recognize the degree or stage of the occurred failure in the own vehicle MV

In particular, the control unit 12 determines whether the degree of the occurred failure represents that the occurred failure is a transient failure or a persistent failure in step S115a.

Upon determination that the degree of the occurred failure represents a transient failure (NO in step S115a), the control unit 12 determines that the degree of a failure does not satisfy the predetermined first criterion condition (NO in step S115).

Otherwise, upon determination that the degree of the occurred failure represents a persistent failure (YES in step S115a), the control unit 12 determines that the degree of a failure satisfies the predetermined first criterion condition (YES in step S115).

Note that the occurred failure at a predetermined portion, i.e. one of the components 21 to 26, 27a, 27b, 28, 29, and 201 to 203, of the own vehicle MV being a transient failure means that the occurred failure is likely to be back to a normal state of the predetermined portion as long as 1. A predetermined period has elapsed since the occurrence of the failure or 2. The predetermined portion of the own vehicle MV has been operated at least a predetermined number of times In contrast, the occurred failure at a predetermined portion, i.e. one of the components 21 to 26, 27a, 27b, 28, 29, and 201 to 203, of the own vehicle MV being a persistent failure means that the occurred failure is unlikely to be back to a normal state of the predetermined portion even if the predetermined period has elapsed since the occurrence of the failure, and the predetermined portion of the own vehicle MV has been operated at least the predetermined number of times.

Next, the following describes in detail the second criterion condition that serves as a criterion for the surrounding conditions around the own vehicle MV.

As described above, the control unit 12 of the autonomous driving control apparatus 10 is configured to obtain, via the communication unit 28, information about the surrounding conditions around the own vehicle MV In particular, the control unit 12 determines whether change or update of the primary scheduled travel route to a new one is likely to be difficult in reaching the destination in step S115b.

Upon determination that update of the primary scheduled travel route to a new one is unlikely to be difficult in reaching the destination (NO in step S115b), the control unit 12 determines that the surrounding conditions around the own vehicle MV does not satisfy the predetermined second criterion condition (NO in step S115).

Otherwise, upon determination that update of the primary scheduled travel route to a new one is likely to be difficult in reaching the destination (YES in step S115b), the control unit 12 determines that the surrounding conditions around the own vehicle MV satisfy the predetermined second criterion condition (YES in step S115).

Note that a case where change or update of the primary scheduled travel route to a new one is unlikely to be difficult in reaching the destination is that 1. The primary scheduled travel route is a single route toward the destination, and the own vehicle MV cannot travel on the single route, or 2. The length of each of the travel route candidates, on which executable driving operations (driving behaviors) of the malfunctioning own vehicle MV enable the own vehicle MV to travel, is longer than a predetermined upper limit length Upon determination that the degree of a failure does not satisfy the predetermined first criterion condition or the surrounding conditions around the own vehicle MV do not satisfy the predetermined second criterion condition (NO in step S115), the control unit 12 performs the operations in steps S120 and S130 in the same manner as the first embodiment.

Otherwise, upon determination that the degree of a failure satisfies the predetermined first criterion condition or the surrounding conditions around the own vehicle MV satisfy the predetermined second criterion condition (YES in step S115), the control unit 12 changes or updates the primary determined destination to a new destination in accordance with, for example, the current position of the own vehicle MV and the map information stored in the large-capacity storage 29d or the map information sent from the one or more traffic servers SER in step S140.

Note that the new destination for the own vehicle MV can include one of

1. A vehicle dealer's shop or a vehicle repair shop locationally closer to the own vehicle MV, which can repair the failure upon determination that the degree of the occurred failure represents a persistent failure (YES in step S115a)

2. A certain size of a region where the own vehicle MV can be safely parked for enabling occupants in the own vehicle MV to wait That is, the control unit 12 can be configured to select, as the new destination for the own vehicle MV, one of new destination candidates in accordance with the failure information, the surrounding conditions, and a distance of each new destination candidate relative to the current position of the own vehicle MV.

After changing of the destination to the new destination, the control unit 12 performs a determination task of determining a changed scheduled travel route toward the changed new destination, and combining, to each of predetermined points included in the changed scheduled travel route, a corresponding one of executable driving operations, i.e. driving behaviors, of the own vehicle MV in step S150 in the same manner as the operation in step S120.

Then, the control unit 12 controls, via the driving system 100, autonomous driving of the own vehicle MV to thereby cause the own vehicle MV to travel in accordance with the changed scheduled travel route toward the changed new destination in step S150 in the same manner as the operation in step S120. Thereafter, the control unit 12 terminates the route change routine.

As described in detail above, the autonomous driving control apparatus 10 according to the second embodiment is configured to change the primary scheduled travel route upon determination that the degree of a failure satisfies the predetermined first criterion condition or the surrounding conditions around the own vehicle MV satisfy the predetermined second criterion condition.

This configuration therefore prevents the own vehicle MV from travelling toward the primary determined destination although it is difficult for the own vehicle MV to reach the primary determined destination Modifications The present disclosure is not limited to the above first and second embodiments set forth above, and can be variously modified for example as follows.

The autonomous driving control apparatus 10 according to each of the first and second embodiments is installed in an autonomous vehicle, but the present disclosure is not limited thereto.

Specifically, a server communicable with the driving system 1 of an autonomous vehicle can include all functions of the autonomous driving control apparatus 10 according to the first embodiment or the second embodiment. This modification enables the server including the autonomous driving control apparatus 10 to control autonomous driving of the autonomous vehicle, making it possible to achieve the technical effects of each of the first and second embodiments.

The autonomous driving control apparatus 10 according to the second embodiment is configured to change the primary scheduled travel route upon determination that the degree of a failure satisfies the predetermined first criterion condition or the surrounding conditions around the own vehicle MV satisfy the predetermined second criterion condition. The present disclosure is however not limited to this configuration.

Specifically, the control unit 12 of the autonomous driving control apparatus 10 according to the second embodiment can be configured to stop, in place of the operations in step S140 and S150, the own vehicle MV at the current position upon determination that 1. The occurred failure may cause continuous execution of the autonomous driving of the own vehicle MV to have a dangerous effect on the own vehicle MV, or 2. Movement of the own vehicle MV may result in a dangerous effect on the own vehicle MV The autonomous driving control apparatus 10 according to each of the first and second embodiments can be configured to determine whether it is necessary to update the scheduled travel route to another route in accordance with any one of 1. Failure information indicative of whether a failure or a malfunction has occurred in the vehicle MV 2. Route condition information indicative of the condition of each road included in the scheduled travel route At least part of all functions provided by the control unit 12 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiment and its modifications can be replaced with a known structure having the same function as the corresponding technical feature. Each of the technical features described in the embodiment and its modifications can also be combined with at least one of the other technical features. At least one of the technical features described in the embodiment and its modifications can further be eliminated unless the at least one of the technical features is described as an essential element in the present specification.

The functions of each of the autonomous driving control units according to the first and second embodiments can be implemented by various embodiments; the various embodiments include autonomous driving control apparatuses, programs for serving a computer as the functions, storage media, such as non-transitory media, storing the programs, and autonomous driving control methods.

What is claimed is:

1. An autonomous driving control apparatus for causing an autonomous vehicle to execute autonomous driving, the autonomous driving control apparatus comprising:
a memory; and
a control unit communicable with the memory, the control unit being configured to:
  determine, upon execution of the autonomous driving, whether it is necessary to update a primary scheduled travel route for the autonomous vehicle toward an original destination in accordance with both failure information about the autonomous vehicle and route condition information indicative of a condition of the primary scheduled travel route;
  update the primary scheduled travel route to a new scheduled travel route to reach the original destination in accordance with one or more driving operations executable by the autonomous vehicle upon determination that it is necessary to update the scheduled travel route; and
  control the autonomous driving of the autonomous vehicle in accordance with the new scheduled travel route, wherein:
the memory stores map information about route candidates on which the autonomous vehicle is travelable;
predetermined priorities are previously assigned to the respective executable driving operations of the autonomous vehicle, the executable driving operations including (i) forward travelling, (ii) rearward travelling, (iii) right turning, and (iv) left turning; and
the control unit is further configured to
  extract, when updating the primary scheduled travel route to the new scheduled travel route, plural travel route candidates from a current position of the autonomous vehicle to the original destination, each of the plural travel route candidates including a plurality of points;
  combine, with each of the plurality of points of each of the extracted plural travel route candidates, a selected one of the executable driving operations of the autonomous vehicle; and
  select, from the extracted plural travel route candidates, one of the extracted plural travel route candidates as the new scheduled travel route, the new scheduled travel route having a highest value of the sum of the priorities assigned to the respective selected driving operations of the new scheduled travel route of all the extracted plural travel route candidates,
wherein the predetermined priorities include prioritization of the respective executable driving operations of the autonomous vehicle based on at least one of a distance criteria, a number of toll road criteria, and a number of turns criteria.

2. The autonomous driving control apparatus according to claim 1, wherein:
the failure information includes a degree of a failure that has occurred in the autonomous vehicle;
the control unit is configured to:
  determine whether the degree of the failure that has occurred in the autonomous vehicle satisfies a predetermined first criterion condition upon determination that it is necessary to update the primary scheduled travel route in accordance with the failure information about the autonomous vehicle;
  update the original destination of the new scheduled travel route to a new destination upon determination that the degree of the failure that has occurred in the autonomous vehicle satisfies the predetermined first criterion condition; and
  control the autonomous driving of the autonomous vehicle in accordance with the new scheduled travel route to thereby cause the autonomous vehicle to reach the new destination.

3. The autonomous driving control apparatus according to claim 2, wherein:
the control unit is configured to:
  determine that the degree of the failure that has occurred in the autonomous vehicle satisfies the predetermined first criterion condition upon determination that the degree of the failure that has occurred in the autonomous vehicle represents that the occurred failure is a persistent failure; and
  determine that the degree of the failure that has occurred in the autonomous vehicle fails to satisfy the predetermined first criterion condition upon determination that the degree of the failure that has occurred in the autonomous vehicle represents that the occurred failure is a transient failure.

4. The autonomous driving control apparatus according to claim 1, wherein:
the control unit is configured to:
  determine whether a surrounding condition around the autonomous vehicle satisfies a predetermined second criterion condition upon determination that it is necessary to update the primary scheduled travel route in accordance with the route condition information;
  update the original destination of the new scheduled travel route to a new destination upon determination that the surrounding condition around the autonomous vehicle satisfies the predetermined second criterion condition; and
  control the autonomous driving of the autonomous vehicle in accordance with the new scheduled travel route to thereby cause the autonomous vehicle to reach the new destination.

5. The autonomous driving control apparatus according to claim 4, wherein:
the control unit is configured to:
  determine that the surrounding condition around the autonomous vehicle satisfies the predetermined second criterion condition upon determination that the surrounding condition represents that there are no other routes that enable the autonomous vehicle to travel to the original destination of the primary scheduled travel route; and
  determine that the surrounding condition around the autonomous vehicle fails to satisfy the predetermined second criterion condition upon determination that the surrounding condition represents that there is at least one other route that enables the autonomous vehicle to travel to the original destination of the primary scheduled travel route.

6. The autonomous driving control apparatus according to claim 1, wherein:
the control unit is configured to determine the one or more driving operations executable by the autonomous vehicle in accordance with the failure information.

7. The autonomous driving control apparatus according to claim 1, wherein:
the one or more driving operations executable by the autonomous vehicle are driving operations;
the driving operations executable by the autonomous vehicle have respective priorities; and
the control unit is configured to update the scheduled travel route to the new scheduled travel route in accordance with the priorities of the respective driving operations executable by the autonomous vehicle.

8. The autonomous driving control apparatus according to claim 1, wherein:
the failure information includes a degree of a failure that has occurred in a predetermined portion of the autonomous vehicle;
the control unit is configured to:
determine whether the degree of the failure that has occurred in the autonomous vehicle satisfies a predetermined first criterion condition upon determination that it is necessary to update the primary scheduled travel route in accordance with the failure information about the autonomous vehicle;
update the original destination of the new scheduled travel route to a new destination upon determination that the degree of the failure that has occurred in the autonomous vehicle satisfies the predetermined first criterion condition;
control the autonomous driving of the autonomous vehicle in accordance with the new scheduled travel route to thereby cause the autonomous vehicle to reach the new destination;
determine that the degree of the failure that has occurred in the autonomous vehicle satisfies the predetermined first criterion condition upon determination that the degree of the failure that has occurred in the autonomous vehicle represents that the occurred failure is a persistent failure,
the persistent failure being defined as a failure that is unlikely to be back to a normal state even if a predetermined period has elapsed since an occurrence of the failure, or the predetermined portion of the autonomous vehicle has been operated at least a predetermined number of times; and
determine that the degree of the failure that has occurred in the autonomous vehicle fails to satisfy the predetermined first criterion condition upon determination that the degree of the failure that has occurred in the autonomous vehicle represents that the occurred failure is a transient failure,
the transient failure being defined as a failure that is likely to be back to a normal state of the predetermined portion as long as
the predetermined period has elapsed since the occurrence of the failure or
the predetermined portion of the autonomous vehicle has been operated at least the predetermined number of times.

9. The autonomous driving control apparatus according to claim 1, wherein:
the control unit is configured to:
determine whether a surrounding condition around the autonomous vehicle satisfies a predetermined second criterion condition upon determination that it is necessary to update the primary scheduled travel route in accordance with the route condition information;
update the original destination of the new scheduled travel route to a new destination upon determination that the surrounding condition around the autonomous vehicle satisfies the predetermined second criterion condition;
control the autonomous driving of the autonomous vehicle in accordance with the new scheduled travel route to thereby cause the autonomous vehicle to reach the new destination;
determine that the surrounding condition around the autonomous vehicle satisfies the predetermined second criterion condition upon determination that the surrounding condition represents that there are no other routes that enable the autonomous vehicle to travel to the original destination of the primary scheduled travel route;
determine that the surrounding condition around the autonomous vehicle fails to satisfy the predetermined second criterion condition upon determination that the surrounding condition represents that there is at least one other route that enables the autonomous vehicle to travel to the original destination of the primary scheduled travel route;
determine whether a length of the new scheduled travel route is longer than a predetermined length upon determining that the autonomous vehicle is enabled to reach the original destination in accordance with the new scheduled travel route; and
determine that the surrounding condition around the autonomous vehicle satisfies the predetermined second criterion condition upon determination that the length of the new scheduled travel route is longer than the predetermined length.

10. The autonomous driving control apparatus according to claim 1, wherein:
the failure information includes a degree of a failure that has occurred in a predetermined portion of the autonomous vehicle;
the control unit is configured to:
determine whether the degree of the failure that has occurred in the autonomous vehicle satisfies a predetermined first criterion condition upon determination that it is necessary to update the primary scheduled travel route in accordance with the failure information about the autonomous vehicle;
update the original destination of the new scheduled travel route to a new destination upon determination that the degree of the failure that has occurred in the autonomous vehicle satisfies the predetermined first criterion condition;
control the autonomous driving of the autonomous vehicle in accordance with the new scheduled travel route to thereby cause the autonomous vehicle to reach the new destination;
determine that the degree of the failure that has occurred in the autonomous vehicle satisfies the predetermined first criterion condition upon determination that the degree of the failure that has occurred in the autonomous vehicle represents that the occurred failure is a persistent failure,
the persistent failure being defined as a failure that is unlikely to be back to a normal state even if a predetermined period has elapsed since an occurrence of the failure, or the predetermined portion of the autonomous vehicle has been operated at least a predetermined number of times;
determine that the degree of the failure that has occurred in the autonomous vehicle fails to satisfy the predetermined first criterion condition upon determination that the degree of the failure that has occurred in the autonomous vehicle represents that the occurred failure is a transient failure,
the transient failure being defined as a failure that is likely to be back to a normal state of the predetermined portion as long as
the predetermined period has elapsed since the occurrence of the failure or the predetermined portion of the autonomous vehicle has been operated at least the predetermined number of times;

determine whether a surrounding condition around the autonomous vehicle satisfies a predetermined second criterion condition upon determination that it is necessary to update the primary scheduled travel route in accordance with the route condition information;

update the original destination of the new scheduled travel route to a new destination upon determination that the surrounding condition around the autonomous vehicle satisfies the predetermined second criterion condition;

control the autonomous driving of the autonomous vehicle in accordance with the new scheduled travel route to thereby cause the autonomous vehicle to reach the new destination;

determine that the surrounding condition around the autonomous vehicle satisfies the predetermined second criterion condition upon determination that the surrounding condition represents that there are no other routes that enable the autonomous vehicle to travel to the original destination of the primary scheduled travel route;

determine that the surrounding condition around the autonomous vehicle fails to satisfy the predetermined second criterion condition upon determination that the surrounding condition represents that there is at least one other route that enables the autonomous vehicle to travel to the original destination of the primary scheduled travel route;

determine whether a length of the new scheduled travel route is longer than a predetermined length upon determining that the autonomous vehicle is enabled to reach the original destination in accordance with the new scheduled travel route; and determine that the surrounding condition around the autonomous vehicle satisfies the predetermined second criterion condition upon determination that the length of the new scheduled travel route is longer than the predetermined length.

11. The autonomous driving control apparatus according to claim 1, wherein the predetermined priorities include prioritization of the respective executable driving operations of the autonomous vehicle based on the distance criteria, the number of toll road criteria, and the number of turns criteria.

12. A method of causing an autonomous vehicle to execute autonomous driving, the method comprising:

determining, upon execution of the autonomous driving, whether it is necessary to update a scheduled travel route for the autonomous vehicle toward an original destination in accordance with both failure information about the autonomous vehicle and route condition information indicative of a condition of the scheduled travel route;

updating the scheduled travel route to a new scheduled travel route to reach the original destination in accordance with one or more driving operations executable by the autonomous vehicle upon determination that it is necessary to update the scheduled travel route;

extracting, when updating the scheduled travel route to the new scheduled travel route, plural travel route candidates from a current position of the autonomous vehicle to the original destination, each of the plural travel route candidates including a plurality of points;

combining, with each of the plurality of points of each of the extracted plural travel route candidates, a selected one of the executable driving operations of the autonomous vehicle;

selecting, from the extracted plural travel route candidates, one of the extracted plural travel route candidates as the new scheduled travel route, the new scheduled travel route having a highest value of the sum of predetermined priorities assigned to the respective selected driving operations of the new scheduled travel route of all the extracted plural travel route candidates, wherein predetermined priorities are previously assigned to the respective executable driving operations of the autonomous vehicle, the executable driving operations including (i) forward travelling, (ii) rearward travelling, (iii) right turning, and (iv) left turning; and controlling the autonomous driving of the autonomous vehicle in accordance with the new scheduled travel route, wherein the predetermined priorities include prioritization of the respective executable driving operations of the autonomous vehicle based on at least one of a distance criteria, a number of toll road criteria, and a number of turns criteria.

13. The method according to claim 12, wherein:
the failure information includes a degree of a failure that has occurred in the autonomous vehicle,
the method further comprising:
determining whether the degree of the failure that has occurred in the autonomous vehicle satisfies a predetermined first criterion condition upon determination that it is necessary to update the primary scheduled travel route in accordance with the failure information about the autonomous vehicle; and changing the original destination of the new scheduled travel route to a new destination upon determination that the degree of the failure that has occurred in the autonomous vehicle satisfies the predetermined first criterion condition, wherein controlling the autonomous driving of the autonomous vehicle in accordance with the new scheduled travel route causes the autonomous vehicle to reach the new destination.

14. The method according to claim 12, further comprising:

determining whether a surrounding condition around the autonomous vehicle satisfies a predetermined second criterion condition upon determination that it is necessary to update the primary scheduled travel route in accordance with the route condition information; and changing the original destination of the new scheduled travel route to a new destination upon determination that the surrounding condition around the autonomous vehicle satisfies the predetermined second criterion condition, wherein controlling the autonomous driving of the autonomous vehicle in accordance with the new scheduled travel route causes the autonomous vehicle to reach the new destination.

15. The method according to claim 12, wherein the predetermined priorities include prioritization of the respective executable driving operations of the autonomous vehicle based on the distance criteria, the number of toll road criteria, and the number of turns criteria.

16. An autonomous driving control apparatus for causing an autonomous vehicle to execute autonomous driving, the autonomous driving control apparatus comprising:
- a memory; and
- a control unit communicable with the memory,
- the control unit being configured to:
  - receive, upon execution of the autonomous driving, at least one of failure information about the autonomous vehicle and route condition information indicative of a condition of a primary scheduled travel route for the autonomous vehicle toward an original destination;
  - select, upon it being necessary to update the primary scheduled travel route in accordance with both the failure information about the autonomous vehicle and the route condition information indicative of the condition of the scheduled travel route, a new scheduled travel route that is different from the primary scheduled travel route, one or more driving operations executable by the autonomous vehicle enabling the autonomous vehicle to travel on the new scheduled travel route; and
  - control the autonomous driving of the autonomous vehicle to thereby cause the autonomous vehicle to reach the original destination, wherein:
- the memory stores map information about route candidates on which the autonomous vehicle is travelable;
- predetermined priorities are previously assigned to the respective executable driving operations of the autonomous vehicle, the executable driving operations including (i) forward travelling, (ii) rearward travelling, (iii) right turning, and (iv) left turning; and
- the control unit is further configured to
  - extract, when updating the primary scheduled travel route to the new scheduled travel route, plural travel route candidates from a current position of the autonomous vehicle to the original destination, each of the plural travel route candidates including a plurality of points;
  - combine, with each of the plurality of points of each of the extracted plural travel route candidates, a selected one of the executable driving operations of the autonomous vehicle; and
  - select, from the extracted plural travel route candidates, one of the extracted plural travel route candidates as the new scheduled travel route, the new scheduled travel route having a highest value of the sum of the priorities assigned to the respective selected driving operations of the new scheduled travel route of all the extracted plural travel route candidates,
- wherein the predetermined priorities include prioritization of the respective executable driving operations of the autonomous vehicle based on at least one of a distance criteria, a number of toll road criteria, and a number of turns criteria.

17. The autonomous driving control apparatus according to claim 16, wherein the predetermined priorities include prioritization of the respective executable driving operations of the autonomous vehicle based on the distance criteria, the number of toll road criteria, and the number of turns criteria.

\* \* \* \* \*